(12) United States Patent
El-Saidny et al.

(10) Patent No.: US 9,247,529 B2
(45) Date of Patent: Jan. 26, 2016

(54) APPARATUS AND METHODS OF MANAGING SIGNALING RADIO BEARER TRANSMISSIONS AT A USER EQUIPMENT

(71) Applicant: QUALCOMM Incorporated, San Diego, CA (US)

(72) Inventors: Mohamed Abdelrazek El-Saidny, Dubai (AE); Ahmad Amin Thalji, San Diego, CA (US); Sharif Ahsanul Matin, San Diego, CA (US); Sitaramanjaneyulu Kanamarlapudi, San Diego, CA (US); Liangchi Hsu, San Diego, CA (US); Tariq Saleh Alsheikh-Eid, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 14/191,185

(22) Filed: Feb. 26, 2014

(65) Prior Publication Data

US 2015/0036667 A1 Feb. 5, 2015

Related U.S. Application Data

(60) Provisional application No. 61/860,175, filed on Jul. 30, 2013.

(51) Int. Cl.
*H04J 3/00* (2006.01)
*H04B 7/216* (2006.01)
(Continued)

(52) U.S. Cl.
CPC .......... *H04W 72/02* (2013.01); *H04W 72/1242* (2013.01); *H04W 72/1284* (2013.01); *H04W 72/1294* (2013.01)

(58) Field of Classification Search
CPC ..................................................... H04W 72/02
USPC ........................................................ 370/336
See application file for complete search history.

(56) References Cited

U.S. PATENT DOCUMENTS

| 2004/0143676 | A1* | 7/2004 | Baudry et al. | 709/237 |
|---|---|---|---|---|
| 2005/0014506 | A1* | 1/2005 | Thorson et al. | 455/450 |
| 2006/0120404 | A1* | 6/2006 | Sebire et al. | 370/469 |

(Continued)

FOREIGN PATENT DOCUMENTS

WO WO-2008/024289 A2 2/2008

OTHER PUBLICATIONS

International Search Report and Written Opinion—PCT/US2014/041341—ISA/EPO—Sep. 16, 2014—(11 pages).

*Primary Examiner* — Gerald Smarth
(74) *Attorney, Agent, or Firm* — Arent Fox LLP

(57) ABSTRACT

Certain aspects of the present disclosure relate to apparatuses and methods of managing signaling radio bearer (SRB) transmissions. In one aspect, the apparatuses and methods are configured to generate a SRB packet comprising signaling information, wherein the SRB packet is configured to be transmitted on a channel according to a scheduling serving grant, determine whether the SRB packet is unable to be transmitted based on resources allocated by the received scheduling serving grant, override the received scheduling serving grant in response to determining that the SRB packet is unable to be transmitted, and transmit at least a part of the SRB packet on the channel. In another aspect, a scheduling information message to indicate whether an additional scheduling severing grant is needed is transmitted on the channel along with at least the part of the SRB packet.

32 Claims, 10 Drawing Sheets

(51) Int. Cl.
*H04W 72/02* (2009.01)
*H04W 72/12* (2009.01)

(56) References Cited

U.S. PATENT DOCUMENTS

| | | | |
|---|---|---|---|
| 2006/0203780 A1* | 9/2006 | Terry | 370/335 |
| 2008/0051098 A1 | 2/2008 | Rao | |
| 2008/0080381 A1 | 4/2008 | Maheshwari et al. | |
| 2008/0089285 A1* | 4/2008 | Pirskanen et al. | 370/329 |
| 2008/0198763 A1* | 8/2008 | Fischer | H04W 8/245 370/254 |
| 2012/0033554 A1 | 2/2012 | Shiva et al. | |
| 2013/0003570 A1 | 1/2013 | Giese et al. | |
| 2013/0022004 A1 | 1/2013 | Chen et al. | |
| 2013/0028212 A1 | 1/2013 | Lohr et al. | |
| 2013/0083702 A1 | 4/2013 | Barany et al. | |
| 2013/0201939 A1 | 8/2013 | Zhang et al. | |
| 2013/0294361 A1 | 11/2013 | Chen et al. | |
| 2014/0064065 A1* | 3/2014 | Rogers | H04W 76/028 370/228 |

* cited by examiner

US 9,247,529 B2

APPARATUS AND METHODS OF MANAGING SIGNALING RADIO BEARER TRANSMISSIONS AT A USER EQUIPMENT

CLAIM OF PRIORITY UNDER 35 U.S.C. §119

The present application for patent claims priority to Provisional Application No. 61/860,175 filed on Jul. 30, 2013, and assigned to the assignee hereof and hereby expressly incorporated by reference herein.

BACKGROUND

Aspects of the present disclosure relate generally to wireless communications and, more particularly, to apparatus and methods of managing signaling radio bearer (SRB) transmissions at a user equipment (UE).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

A UE communicating with a UMTS network may operate in a non-scheduled mode or in a scheduled mode with respect to transmitting information. For example, in the non-scheduled mode, the UE may be allowed to send only up to a fixed amount of information (referred to as a grant) in a given transmission time interval (TTI). In contrast, in the scheduled mode, the amount of information the UE may send, e.g., the grant, in a TTI may vary based on a number of factors, but in some non-limiting cases may be reduced to zero. The information that the UE transmits may include SRB packets and data packets. For example, the SRB packets may include Access Stratum (AS) and/or Non-Access Stratum (NAS) signaling information related to one or more signaling messages, such as, but not limited to, measurement report messages, reconfiguration messages, or an AS or NAS related messages. Further, for example, the data packet may include circuit-switched (CS) and/or packet-switched (PS) data.

Because of the importance of the SRB packets in maintaining the communication between the UE and the network, the performance of the UE and/or the network may be compromised when SRB packets are not transmitted in a timely manner. For example, when the UE is operating in the scheduled mode and the grant is reduced to zero, the UE operating according to currently available solutions is prohibited from transmitting a pending SRB packet. As such, the UE may experience delays in sending SRB packets to the network, which may lead to less than optimal communication between the UE and the network, or possibly a call drop when the zero-grant condition persists. As such, improvements in managing the transmission of SRB packets from the UE are desired.

SUMMARY

The following presents a simplified summary of one or more aspects of methods and systems for managing signaling radio bearer transmissions at a user equipment. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In one aspect, a method of wireless communications at a UE is disclosed. In the aspect, the method comprises generating a SRB packet comprising signaling information, wherein the SRB packet is configured to be transmitted on a channel according to a received scheduling serving grant. The method further comprises determining whether the SRB packet is unable to be transmitted based on resources allocated by the received scheduling serving grant. Additionally, the method comprises overriding the received scheduling serving grant in response to determining that the SRB packet is unable to be transmitted. Moreover, the method comprises transmitting at least a part of the SRB packet on the channel.

In another aspect, a computer program product for wireless communications at a UE is disclosed and comprises a computer-readable medium. In the aspect, the computer-readable medium includes code executable by a computer to generate a SRB packet comprising signaling information, wherein the SRB packet is configured to be transmitted on a channel according to a scheduling serving grant. The computer-readable medium also includes code executable by the computer to determine whether the SRB packet is unable to be transmitted based on resources allocated by the received scheduling serving grant. The computer-readable medium further includes code executable by the computer to override the received scheduling serving grant in response to determining that the SRB packet is unable to be transmitted. Additionally, the computer-readable medium includes code executable by the computer to transmit at least a part of the SRB packet on the channel.

In a further aspect, an apparatus for wireless communications is disclosed. In the aspect, the apparatus comprises means for generating a SRB packet configured to be transmitted on a channel according to a scheduling serving grant. Additionally, the apparatus comprises means for determining whether the SRB packet is unable to be transmitted based on resources allocated by the received scheduling serving grant. Furthermore, the apparatus comprises means for overriding the received scheduling serving grant in response to determining that the SRB packet is unable to be transmitted. Moreover, the apparatus comprises means for transmitting at least a part of the SRB packet on the channel.

Moreover, in an aspect, an apparatus for wireless communications is disclosed. In the aspect, the apparatus comprises a SRB generator component configured to generate a SRB packet comprising signaling information, wherein the SRB packet is configured to be transmitted on a channel according to a scheduling serving grant. The apparatus is further comprises a grant determiner component configured to determine whether the SRB packet is unable to be transmitted based on resources allocated by the received scheduling serving grant. The apparatus additionally comprises a grant overriding component configured to override the received scheduling serving grant in response to determining that the SRB packet is unable to be transmitted. The apparatus also comprises a transmitter component configured to transmit at least a part of the SRB packet on the channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to managing SRB transmissions at a UE. Specifically, a UE communicating with a UMTS network may operate in a non-scheduled mode or in a scheduled mode with respect to transmitting information. For example, in the scheduled mode, the UE may be granted a limited amount resources for sending information through the network in a given transmission time interval (TTI). Such a grant may be referred to in the art, but not limited to, a scheduling serving grant.

In an aspect, the scheduling serving grant may be received by the UE from a serving cell in the wireless communication system during and/or after a call setup or an ongoing call. In such an aspect, a UE that attempts to send one or more SRB packets comprising signaling information through the wireless communication system may be unsuccessful if it is determined that the SRB packet is unable to be transmitted based on resources allocated by the received scheduling serving grant. As such, according to the present apparatus and methods, overriding the received scheduling serving grant in response to determining that the SRB packet is unable to be transmitted in accordance to the scheduling serving grant and transmitting at least a part of the SRB packet on the channel may be performed to enhance wireless communications. Accordingly, in some aspects, the present apparatus and methods provide an efficient solution, as compared to current solutions, to more effectively manage the transmission of SRB packets in wireless communication systems.

Figure 1:
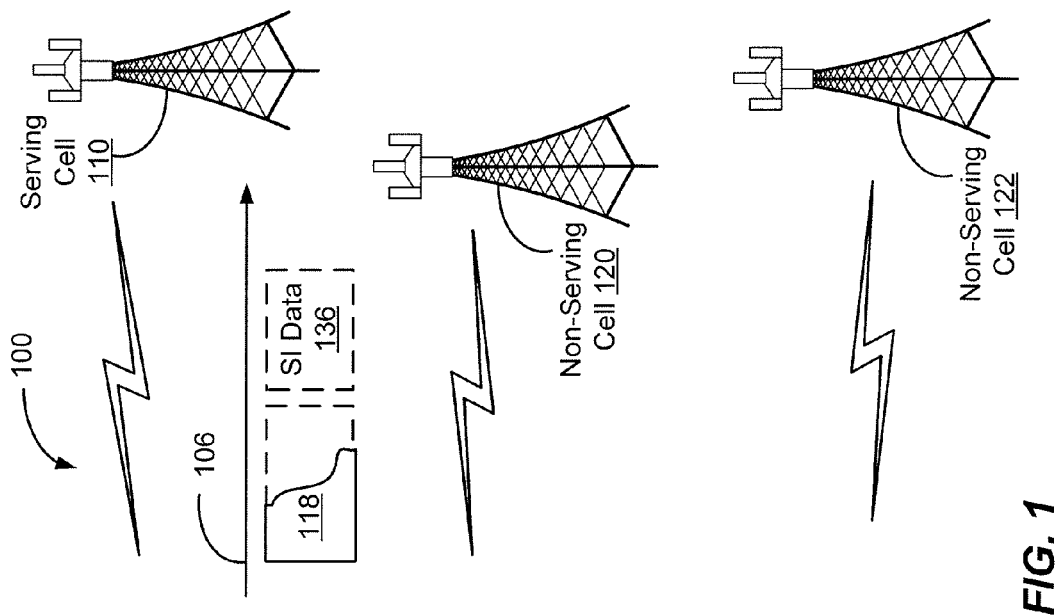
FIG. 1 is a block diagram of an aspect of a wireless communication system, including UE configured to manage transmission of SRB packets comprising signaling information, as described herein.
Figure 1:
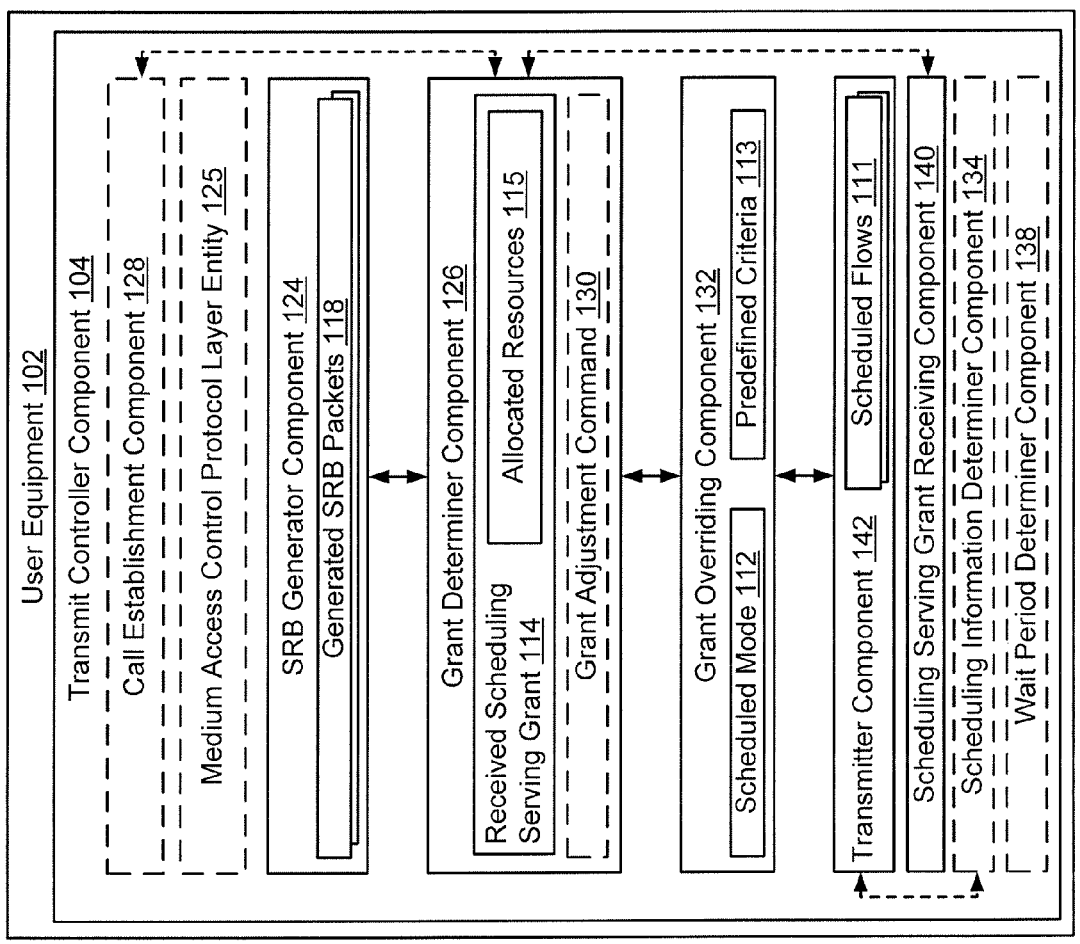

Referring to FIG. 1, in an aspect, a wireless communication system 100 may include user equipment (UE) 102 having a transmit controller component 104 that may be configured to enable transmitting an uplink (UL) signal 106, including at least a part of one or more generated signaling radio bearer (SRB) packets 118 comprising signaling information, to a serving cell 110 when UE 102 operates in a scheduled mode 112 even when it is determined that one or more generated SRB packets 118 are unable to be transmitted based on allocated resources 115 by received scheduling serving grant 114. In other words, even when it is determined that one or more generated SRB packets 118 are unable to be transmitted based on allocated resources 115 provided by received scheduling serving grant 114, UE 102 may be configured to override the conventional operation of scheduled mode 112 and received scheduling serving grant 114 to allow UE 102 to transmit a threshold amount of generated SRB packets 118 within a given set of one or more transmission time intervals (TTIs). For example, the threshold amount of generated SRB packets 118 may be less than a whole packet or the threshold amount may be one or more whole packets. As such, according to the present apparatus and methods, UE 102 may be configured to transmit at least a part of one or more generated SRB packets 118 when operating in scheduled mode 112 and when it is determined that one or more generated SRB packets 118 are unable to be transmitted based on allocated resources 115 provided by received scheduling serving grant 114, which may improve communications and/or avoid a call drop.

According to the aspects, the signaling information comprised in generated SRB packets 118 may be signaling information such as Level 2 acknowledgements. Further according to the aspects, the signaling information comprised in generated SRB packets 118 may be signaling messages such as Level 3 messages.

In some aspects, such as in a soft handover scenario, besides being in communication with serving cell 110, UE 102 may also be in communication with one or more non-serving, neighbor cells, such as non-serving cell 120 and non-serving cell 122. Serving cell 110, non-serving cell 120 and non-serving cell 122, which also may be referred to as access points or nodes, may be any one of a macro cell, small cell, relay, Node B, mobile Node B, UE (e.g., communicating in peer-to-peer or ad-hoc mode with UE 102), or substantially any type of component that can communicate with UE 102 to provide wireless network access.

As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

Further, UE 102 may be a mobile communications apparatus, which also may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, transmit controller component 104 manages transmissions from UE 102. For example, transmit controller component 104 may receive control plane data, such as AS or NAS related information, and/or user plane data including circuit-switched (CS) and/or packet-switched (PS) data, and coordinate generation of data packets, mapping data from logical channels to one or more transport/physical channels and scheduling transmission of the data packets on the one or more transport/physical channels. Further in the aspect, transmit controller component 104 may include a medium access control (MAC) protocol layer entity 125, which may define the MAC protocol layer entity type used for mapping data from the logical channels to the one or more transport/physical channels and for scheduling the of transmission of the data packets on the one or more transport/physical channels. As an example, MAC protocol layer entity 125 may be, but not limited to, a MAC-c entity, a MAC-b entity, a dedicated medium access control (MAC-d) entity, a MAC-hs entity, a MAC-e/es entity, a MAC-ehs entity, and a MAC-i/is entity.

In an aspect, transmit controller component 104 may include an SRB generator component 124 configured to generate one or more generated SRB packets 118, which in turn are configured to be transmitted on the one or more transport/physical channels according to received scheduling serving grant 114. In another aspect, SRB generator component 124 may be configured to receive one or more generated SRB packets 118 from one or more upper layer entities, such as a radio link control (RLC) protocol layer entity, a radio resource control (RRC) protocol layer entity, a NAS protocol layer entity, or an application layer entity.

Further, in the present aspects, SRB generator component 124 may map the one or more generated SRB packets 118 onto one or more scheduled flows 111, which may correspond to one or more transport/physical channels, according to received scheduling serving grant 114. Further, SRB generator component 124 may schedule the transmission of the mapped one or more generated SRB packets 118, according to received scheduling serving grant 114, on the one or more transport/physical channels. In this case, depending on the configuration of transmit controller component 104, the scheduling may include scheduling transmission of at least a part of one or more generated SRB packets 118.

In an aspect, transmit controller component 104 may include a grant determiner component 126 configured to manage received scheduling serving grant 114, and adjustments thereto, for UE 102. For example, UE 102 may receive an initial value of scheduling serving grant 114 during and/or after a call establishment procedure, or call setup, executed by call establishment component 128 with serving cell 110. As such, the initial value of scheduling serving grant 114 may define an amount of transmission resources, such as allocated resources 115, available for UE 102 to transmit information, such as one or more generated SRB packets 118.

Additionally, in these aspects, as UE 102 is operating in scheduled mode 112, grant determiner component 126 may subsequently receive one or more grant adjustment command 130 that trigger grant determiner component 126 to make an adjustment to the initial value of received scheduling serving grant 114. For example, each grant adjustment command 130 may include a grant power up command or a grant power down command, which respectively may dictate a relative adjustment (up or down) to the initial value, or which respectively may dictate an absolute value to use to replace the initial value of received scheduling serving grant 114.

For instance, in an aspect, grant determiner component 126 may receive grant adjustment command 130 from an external entity, such as from non-serving cell 120 and/or non-serving cell 122. In one example of this scenario, non-serving cell 120 and/or non-serving cell 122 may send a scheduling serving grant down command, e.g., an indicator or parameter having a certain value corresponding to a down adjustment, when non-serving cell 120 and/or non-serving cell 122 are experiencing interference above a threshold level. In this example scenario, even though non-serving cell 120 and/or non-serving cell 122 are non-serving cells, grant determiner component 126 may be configured to execute an "or-of-the-downs" procedure that dictates that any scheduling serving grant down command from any cell may need to be executed. As such, in response to the received scheduling serving grant down command, grant determiner component 126 may execute grant adjustment command 130 to reduce a value of scheduling serving grant 114, thereby potentially reducing interference experienced by non-serving cell 120 and/or non-serving cell 122. It is noted that other scenarios may involve grant determiner component 126 executing grant adjustment command 130 in the form of a grant up command to increase a value of received scheduling serving grant 114. Also, as noted, besides indicating a relative grant, e.g., an adjustment up or down relative to a current value of scheduling serving grant 114, grant adjustment command 130 may also include an absolute grant that includes an indicator of or a parameter for replacing the current value of received scheduling serving grant 114 with an absolute grant value.

Further, in another aspect, grant determiner component 126 may receive grant adjustment command 130 from an internal entity or component of UE 102. For example, each network operator and/or device or component manufacturer may have proprietary procedures associated with one or more UE components that may affect a value of received scheduling serving grant 114. As such, in response to the received scheduling serving grant down command, grant determiner component 126 may execute grant adjustment command 130 to reduce a value of received scheduling serving grant 114, thereby potentially reducing interference experienced by non-serving cell 120 and/or non-serving cell 122.

In a further aspect, grant overriding component 132 manages transmit operations with respect to grants for UE 102 operating in scheduled mode 112. For example, during conventional operation under scheduled mode 112, grant overriding component 132 ensures transmissions over one or more transport/physical channels are within a current value of received scheduling serving grant 114. In addition, in the present aspects, grant overriding component 132 is configured to detect when one or more generated SRB packets 118 are mapped and scheduled for transmission over one or more transport/physical channels, but transmission is prohibited, limited, or barred due to conventional operation under scheduled mode 112 based on allocated resources 115 provided by received scheduling serving grant 114.

In an additional aspect, grant overriding component 132 may be configured to override received scheduling serving grant 114 in response to determining that one or more generated SRB packets 118 are unable to be transmitted. In this case, grant overriding component 132 is configured to operate scheduled mode 112 in a state that allows at least a part of one or more generated SRB packets 118 to be transmitted, for example, based on predefined criteria 113 that allows a threshold amount and/or rate of generated SRB packets 118 to be sent. In other words, grant overriding component 132 operates scheduled mode 112 in a state to effectively boost or increase a value of received scheduling serving grant 114, in a manner governed by predefined criteria 113, to enable transmission of all or a part of one or more generated SRB packets 118. As such, grant overriding component 132 enables predefined criteria 113 to supersede a current value of received scheduling serving grant 114, thereby enabling UE 102 to transmit at least a part of one or more generated SRB packets 118 in a condition when conventional operation of scheduled mode 112 would not allow such a transmission.

Optionally, in an aspect, transmit controller component 104 may include a scheduling information (SI) determiner component 134 configured to determine SI data 136, which in some aspects may be transmitted in addition to, or subsequent to, at least a part of one or more generated SRB packets 118 when it is determined that one or more generated SRB packets 118 are unable to be transmitted based on allocated resources 115 provided by received scheduling serving grant 114. For example, in an aspect, SI data includes a system information message that identifies packets, e.g., SRB packets and/or CS and/or PS packets, queued for transmission at UE 102. As such, based on SI data, serving cell 110 may be able to generate a new scheduling serving grant 114 and/or grant adjustment command 130 to provide UE 102 with resources to enable transmission of the pending packets. As noted, transmit controller component 104 may flexibly configure transmissions when it is determined that one or more generated SRB packets 118 are unable to be transmitted based on allocated resources 115 provided by the received scheduling serving grant 114 to include both at least a part of one or more generated SRB packets 118 and SI data in signal 106, or to only include at least a part of one or more generated SRB packets 118 in signal 106 and to send a separate, subsequent signal having only SI data. For instance, transmit controller component 104 may flexibly configure such transmissions in order to reduce interference (e.g., with non-serving cell 120 and/or non-serving cell 122) and/or reduce overhead, or based on other considerations.

In another optional aspect, transmit controller component 104 may include a wait period determiner component 138 configured to determine a wait period between sending successive generated SRB packets 118 when it is determined that one or more generated SRB packets 118 are unable to be transmitted based on allocated resources 115 by the received scheduling serving grant 114. For example, in this option, in order to respect the external conditions or internal conditions that may have caused allocated resources 115 by received scheduling grant 114 to be such that one or more generated SRB packets 118 are unable to be transmitted, wait period determiner component 138 may space apart transmissions of generated SRB packets 118 on one or more transport/physical channels by one or more TTIs. For instance, this may minimize interference with non-serving cell 120 and/or non-serving cell 122. In an aspect, wait period determiner component 138 may determine the wait period or spacing based upon a fixed spacing, or based upon an urgency or priority of the pending generated SRB packets 118, or based upon a number of the pending generated SRB packets 118, or based on any other suitable factor. Moreover, wait period determiner component 138 may be configured to detect receipt of a given number of grant adjustment commands 130 that are scheduling serving grant down commands in a given number of TTIs, or some receipt of a threshold number of scheduling serving grant down commands, and in response implement the waiting period to manage the transmission of the pending generated SRB packets 118 when it is determined that one or more generated SRB packets 118 are unable to be transmitted based on allocated resources 115 by the received scheduling serving grant 114.

Additionally, transmit controller component 104 may include a scheduling serving grant receiving component 140 to receive communications from one or more external entities, that may optionally be communicatively coupled to grant determiner component 126. As an example, scheduling serving grant component 140 may be configured to receive one or more scheduling serving grants 114 from serving cell 110 or non-serving cells 120/122. As another example, scheduling serving grant receiving component 140 may be configured to receive one or more grant adjustment commands 130, such as a grant up or a scheduling serving grant down command, from serving cell 110 or non-serving cells 120/122.

In another aspect, transmit controller component 104 may include a transmitter component 142 to transmit communications, e.g. signal 106, to one or more external entities. For example, scheduling serving grant receiving component 140 and transmitter component 142 may include one or more antennas and one or more respective receive chain and transmit chain components. Further, for example, scheduling serving grant receiving component 140 and transmitter component 142 may be a transceiver.

Thus, according to the present apparatus and methods, UE 102 operating transmit controller component 104 is configured to override received scheduling serving grant 114 in response to determining that one or more generated SRB packets 118 are unable to be transmitted based on allocated resources 115 provided by received scheduling serving grant 114, and further configured to transmit at least a part of one or more generated SRB packet 118 according stored criteria 113. As such, the present apparatus and methods effectively increase a value to scheduling serving grant 114 which allows for some degree of SRB packet transmission and which may enable UE 102 to better maintain communications with one or more network entities and/or avoid a call drop.

Figure 2:
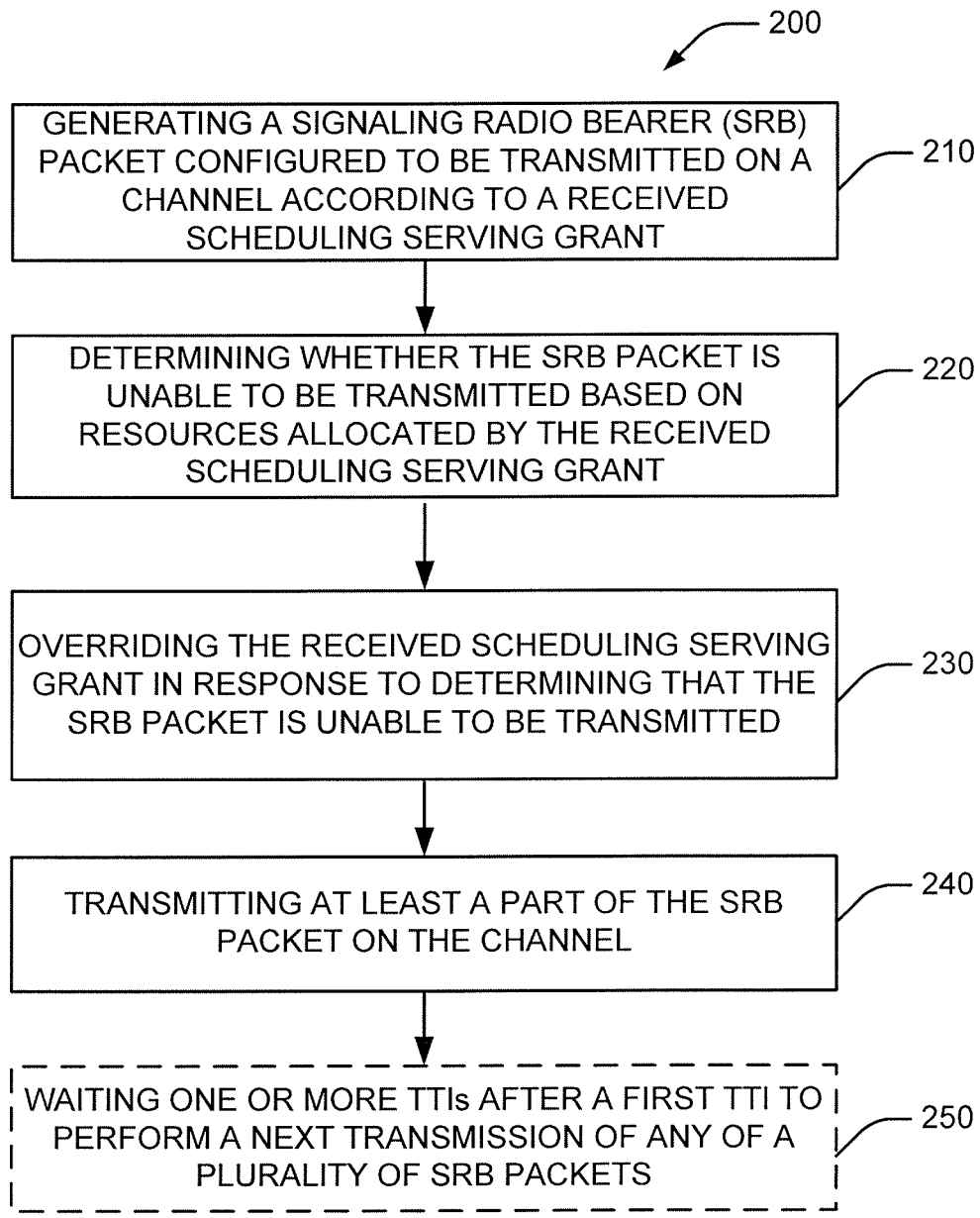
FIG. 2 is a flow chart of an aspect of a method of managing transmission of SRB packets, as described herein.

Referring to FIG. 2, in an aspect, a method 200 of managing transmission of SRB packets may be performed by UE 102 of FIG. 1. More particularly, aspects of method 200 may be performed by one or more components of UE 102.

At 210, the method 200 includes generating a signaling radio bearer (SRB) packet comprising signaling information, wherein the SRB packet is configured to be transmitted on a transport/physical channel according to a received scheduling serving grant. In an aspect, for example, transmit controller component 104 and/or SRB generator component 124 may be configured to generate one or more generated SRB packets 118 and map and schedule them for transmission on one or more transport/physical channels according to received scheduling serving grant 114, and perform other functions as described herein.

At 220, the method includes determining whether the SRB packet is unable to be transmitted based on resources allocated by the received scheduling serving grant. In an aspect, for example, transmit controller component 104 and/or grant determiner component 126 may be configured to manage and/or adjust a current value of received scheduling serving grant 114 and determine whether one or more generated SRB packets 118 are unable to be transmitted based on allocated resources 115 by the received scheduling serving grant 114, and perform other functions as described herein.

At 230, the method 200 includes overriding the received scheduling serving grant in response to determining that the SRB packet is unable to be transmitted. In an aspect, for example, transmit controller component 104 and/or grant overriding component 132 may be configured to override or supersede conventional operation of scheduling mode 112 to reserve at least some transmit resources for transmitting at least a part of one or more of generated SRB packets 118 based on one or more predefined criteria 113.

At 240, the method 200 includes transmitting at least a part of the SRB packet on the transport/physical channel. In an aspect, for example, transmit controller component 104 and/or transmitter component 142 may be configured to transmit signal 106 including at least a part of one or more generated SRB packets 118.

Optionally, at 250, when a plurality of SRB packets are generated for transmission, the method 200 may include waiting one or more TTIs after a first TTI in which one of the SRB packets is transmitted to perform a next transmission of any remaining ones of the plurality of SRB packets. In an aspect, for example, transmit controller component 104 and/or wait period determiner component 138 may be configured to determine a wait period or spacing between successive transmissions of generated SRB packets 118. For example, in an aspect, execution of wait period determiner component 138 may be triggered by receiving a certain number or rate of grant adjustment commands 130 that are down commands.

Figure 3:
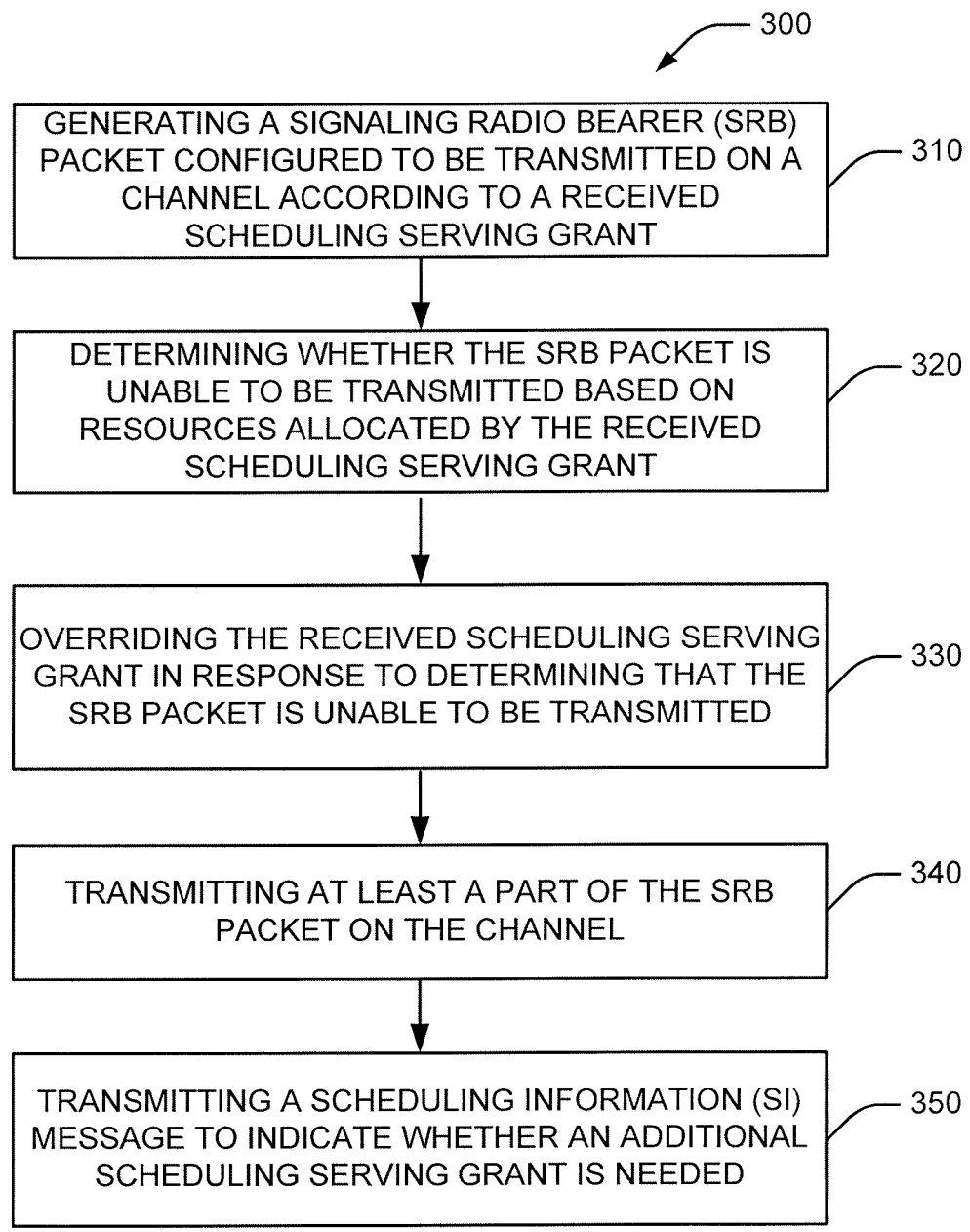
FIG. 3 is a flow chart of another aspect of a method of managing transmission of SRB packets, as described herein.

Referring to FIG. 3, in an additional aspect, a method 300 of managing transmission of SRB packets may be performed by UE 102 of FIG. 1. More particularly, aspects of method 300 may be performed by one or more components of UE 102.

At 310, the method 300 includes generating a SRB packet configured to be transmitted on a transport/physical channel according to a received scheduling serving grant. In an aspect, for example, transmit controller component 104 and/or SRB generator component 124 may be configured to generate one or more generated SRB packets 118 and map and schedule them for transmission on one or more transport/physical channels according to received scheduling serving grant 114, and perform other functions as described herein.

At 320, the method includes determining whether the one or more generated SRB packets are unable to be transmitted based on resources allocated by the received scheduling serving grant. In an aspect, for example, transmit controller component 104 and/or grant determiner component 126 may be configured to manage and/or adjust a current value of received scheduling serving grant 114 and determine whether one or more generated SRB packets 118 are unable to be transmitted based on allocated resources 115 by the received scheduling serving grant 114, and perform other functions as described herein.

At 330, the method 300 includes overriding the received scheduling serving grant in response to determining that the one or more generated SRB packets are unable to be transmitted. In an aspect, for example, transmit controller component 104 and/or grant overriding component 132 may be configured to override or supersede conventional operation of scheduling mode 112 to reserve at least some transmit resources for transmitting at least a part of one or more of generated SRB packets 118, based on one or more predefined criteria 113.

At 340, the method 300 includes transmitting at least a part of the one or more generated SRB packets on the transport/physical channel. In an aspect, for example, transmit controller component 104 and/or transmitter component 142 may be configured to transmit signal 106 including at least a part of one or more generated SRB packets 118 on a transport/physical channel.

At 350, method 300 includes transmitting a SI message to indicate whether an additional scheduling serving grant is needed. In an aspect, transmit controller component 104 may include an SI determiner component 134 configured to determine SI data (e.g., SI data 136 FIG. 1), which in some aspects may be transmitted in addition to, or subsequent to, at least a part of one or more generated SRB packets 118 when it is determined that one or more generated SRB packets 118 are unable to be transmitted based on allocated resources 115 provided by received scheduling serving grant 114. For example, in an aspect, SI data includes a system information message that identifies packets, e.g., SRB packets and/or CS and/or PS packets, queued for transmission at UE 102. As such, based on SI data, serving cell 110 may be able to generate a new scheduling serving grant 114 and/or grant adjustment command 130 to provide UE 102 with resources to enable transmission of the pending packets.

Figure 4:
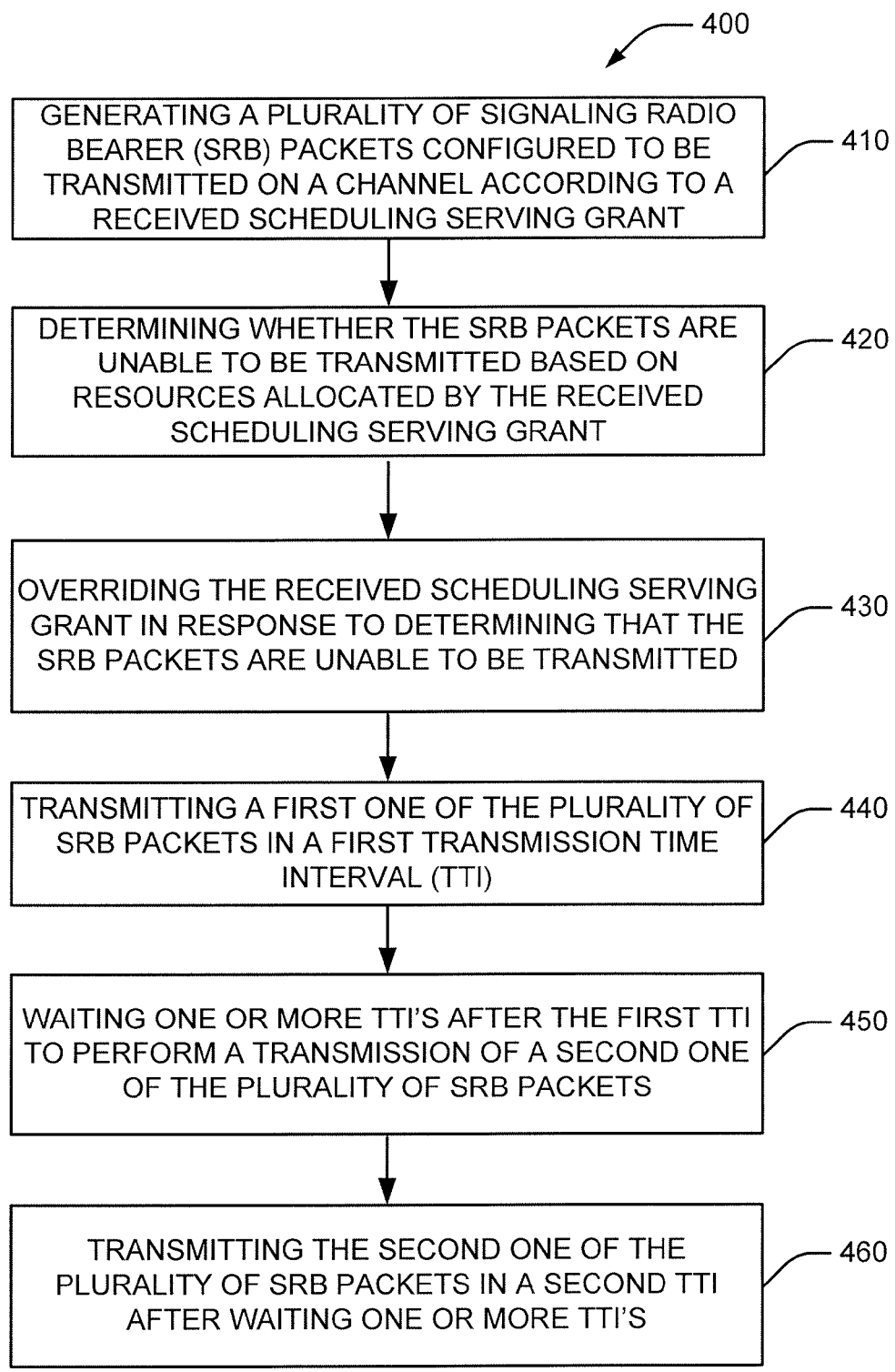
FIG. 4 is a flow chart of a further aspect of a method of managing transmission of SRB packets, as described herein.

Referring to FIG. 4, in a further aspect, a method 400 of managing transmission of one or more generated SRB packets may be performed by UE 102 of FIG. 1. More particularly, aspects of method 400 may be performed by one or more components of UE 102.

At 410, the method 400 includes generating a plurality of SRB packets configured to be transmitted on a transport/physical channel according to a received scheduling serving grant. In an aspect, for example, transmit controller component 104 and/or SRB generator component 124 may be configured to generate a plurality of generated SRB packets 118 and map and schedule them for transmission on one or more transport/physical channels according to received scheduling serving grant 114, and perform other functions as described herein.

At 420, the method includes determining whether the plurality of generated SRB packets are unable to be transmitted based on resources allocated by the received scheduling serving grant. In an aspect, for example, transmit controller component 104 and/or grant determiner component 126 may be configured to manage and/or adjust a current value of received scheduling serving grant 114 and determine whether the plurality of generated SRB packets 118 are unable to be transmitted based on allocated resources 115 by the received scheduling serving grant 114, and perform other functions as described herein.

At 430, the method 400 includes overriding the received scheduling serving grant in response to determining that the plurality of generated SRB packets are unable to be transmitted. In an aspect, for example, transmit controller component 104 and/or grant overriding component 132 may be configured to override or supersede conventional operation of scheduling mode 112 to reserve at least some transmit resources for transmitting the plurality of generated SRB packets 118 based on one or more predefined criteria 113.

At 440, the method 400 includes transmitting a first one of the plurality of generated SRB packets in a first TTI on the transport/physical channel. In an aspect, for example, transmit controller component 104 and/or transmitter component 142 may be configured to transmit signal 106 including one of the plurality of generated SRB packets 118.

At 450, the method includes waiting one or more TTIs after the first TTI to perform a transmission of a second one of the plurality of generated SRB packets. In an aspect, for example, transmit controller component 104 and/or wait period determiner component 138 may be configured to determine a wait period or spacing between successive transmissions a next transmission of a second one of the plurality of generated SRB packets 118.

At 460, the method 400 includes transmitting the second one of the plurality of generated SRB packets in a second TTI after waiting one or more TTIs. In an aspect, for example, transmit controller component 104 and/or transmitter component 142 may be configured to transmit signal 106 including a second one of the plurality of generated SRB packets 118 in a second TTI after waiting one or more TTIs.

Figure 5:
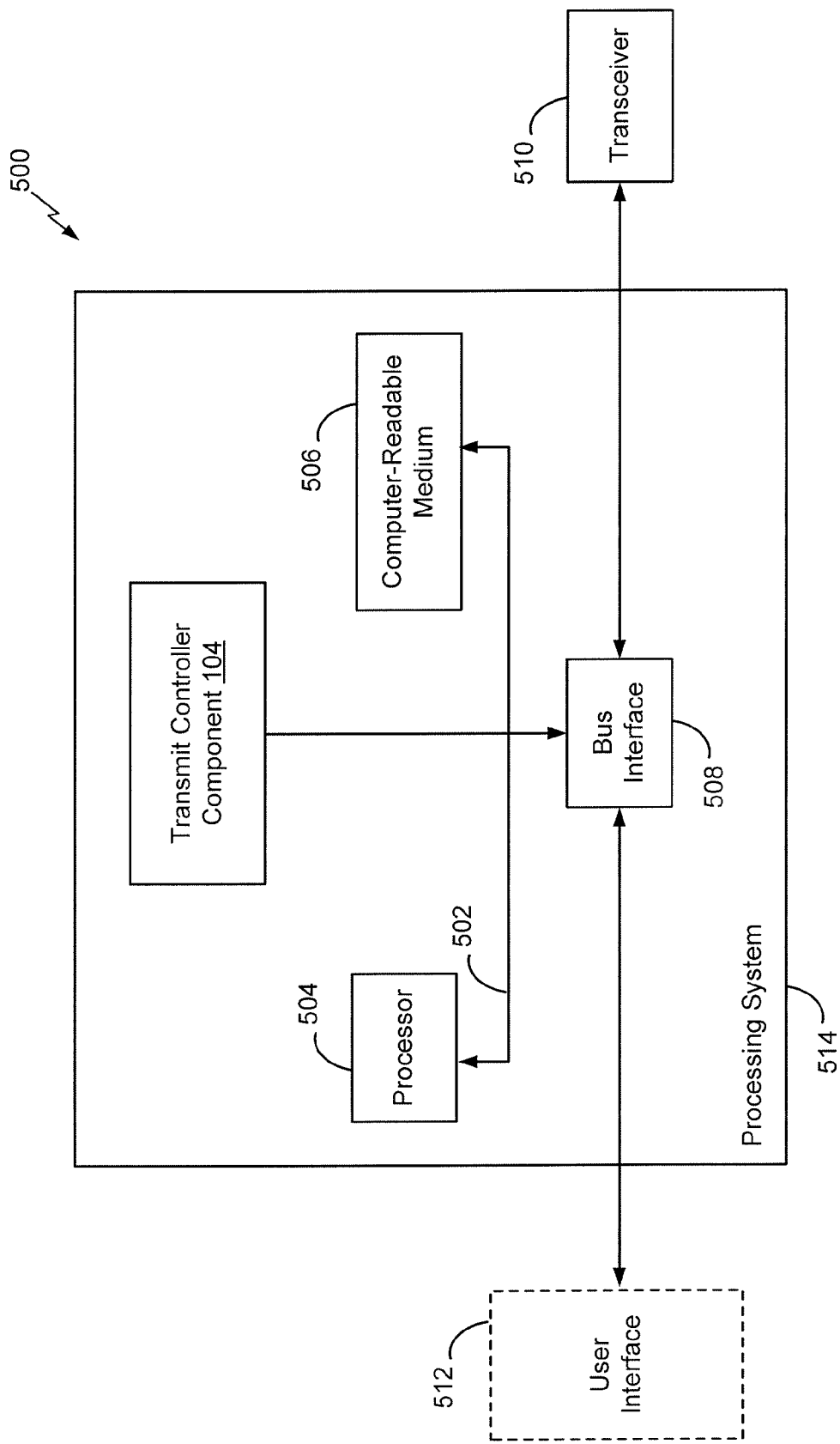
FIG. 5 is a block diagram illustrating an example of a hardware implementation for an apparatus employing a processing system including functionality to manage transmission of SRB packets, as described herein.

FIG. 5 is a block diagram illustrating an example of a hardware implementation for an apparatus 500 employing a processing system 514, where apparatus 500 may be, in an aspect, UE 102 of FIG. 1 including transmit controller component 104. In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506. The bus 502 also links together one or more components of UE 102 and/or transmit controller component 104, as described herein with respect to FIG. 1. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a mechanism for communicating with various other apparatus over a transmission medium. In an aspect, for example, transceiver 510 may provide a mechanism for communicating with one or more of serving cell 110, non-serving cell 120 and/or non-serving cell 122 of FIG. 1. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described herein with respect to FIGS. 1-4. In some aspects, the various functions described herein may be performed by one or both of the processor 504 and the transmit controller component 104. Additionally, in some aspects, transmit controller component 104 may be incorporated into processor 504. The computer-readable medium 506 may also be used for storing data that is manipulated by the processor 504 when executing software.

Figure 6:
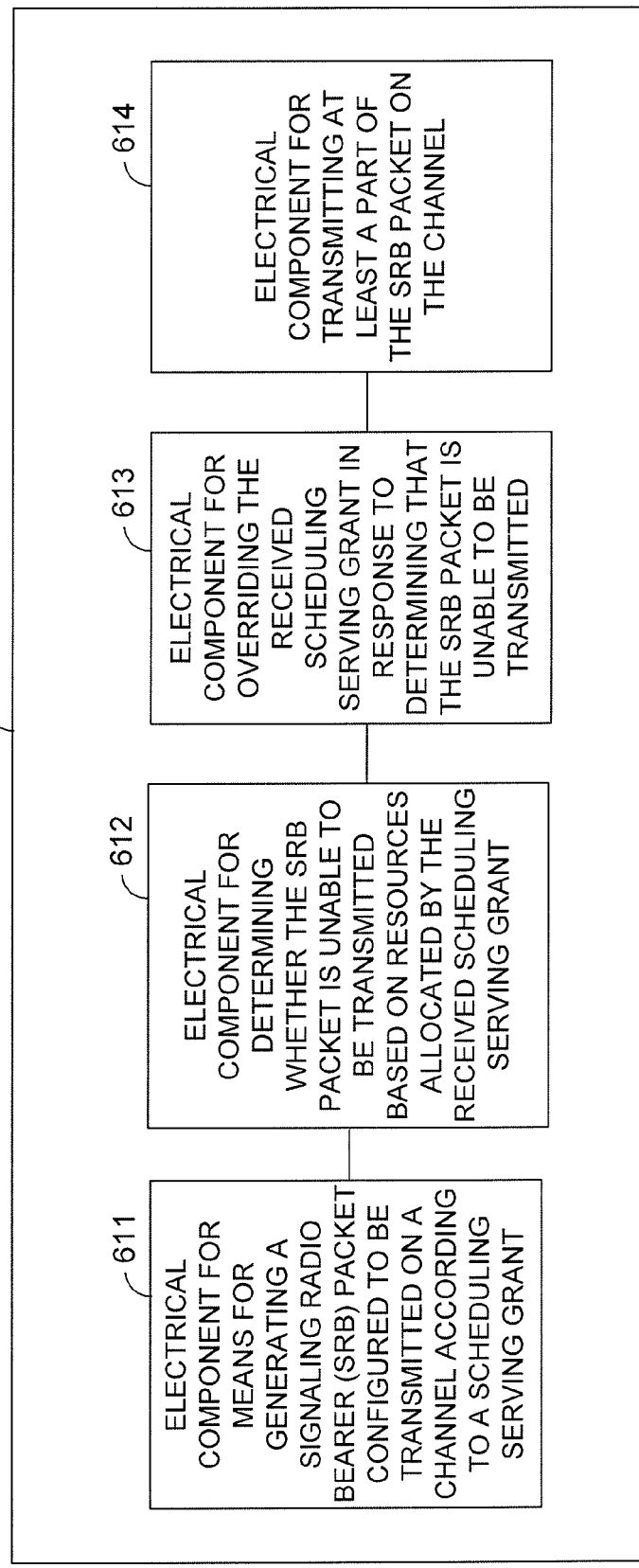
FIG. 6 is a block diagram illustrating an example system for managing transmission of SRB packets according to one aspect.

FIG. 6 illustrates a system 600 for managing the transmission of SRB packets based on the principles disclosed herein. For example, system 600 can be implemented in UE 102 of FIG. 1. It is to be appreciated that system 600 is represented as including functional blocks, which can be functional blocks that represent functions implemented by a processor, software, or combination thereof (e.g., firmware). System 600 includes a logical grouping 610 of electrical components that can act in conjunction. For instance, logical grouping 610 may include an electrical component 611 for generating a signaling radio bearer (SRB) packet configured to be transmitted on a transport/physical channel according to a scheduling serving grant. Further, logical grouping 610 may comprise an electrical component 612 for determining whether the SRB packet is unable to be transmitted based on resources allocated by the received scheduling serving grant. Additionally, logical grouping 600 may include an electrical component 613 for overriding the received scheduling serving grant in response to determining that the SRB packet is unable to be transmitted. Moreover, logical grouping 600 may include an electrical component 614 for transmitting at least a part of the SRB packet on the transport/physical channel.

Additionally, system 600 can include a memory 620 that retains instructions for executing functions associated with the electrical components 611-614. In an aspect, memory 620 may include a computer-readable medium such as computer-readable medium 506 of FIG. 5. In another aspect, memory 620 may be incorporated into a processor such as processor 504 of FIG. 5. While shown as being external to memory 620, it is to be understood that one or more of the electrical components 611-614 can exist within memory 620. In one example, electrical components 611-614 can comprise at least one processor, or each electrical component 611-614 can be a corresponding module of at least one processor, such as processor 504 of FIG. 5. Moreover, in an additional or alternative example, electrical components 611-614 can be a computer program product comprising a computer-readable medium, such as computer-readable medium 506 of FIG. 5, where each electrical component 611-614 can be corresponding code.

Figure 7:
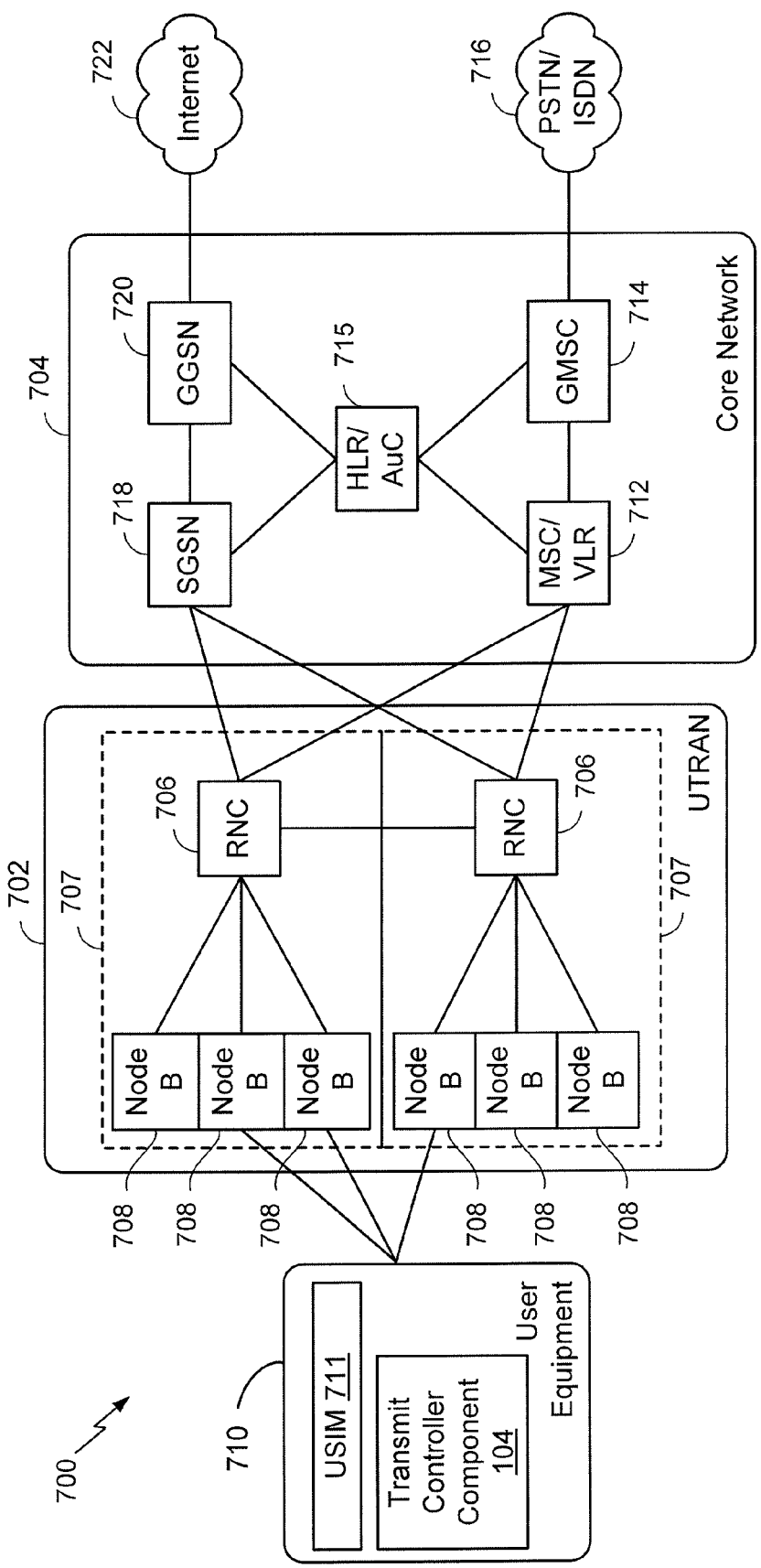
FIG. 7 is a block diagram conceptually illustrating an example of a telecommunications system including the UE of FIG. 1.

Referring to FIG. 7, by way of example and without limitation, the aspects of the present disclosure are presented with reference to a UMTS system 700 employing a W-CDMA air interface in which a UE, such as the UE 102 of FIG. 1 configured with transmit controller component 104, may operate.

A UMTS network includes three interacting domains: a Core Network (CN) 704, a UTRAN 702, and UE 710. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708 may be considered as including a physical (PHY) layer and a MAC layer. In an aspect, UE 710 may be UE 102 of FIG. 1 and Node B 708 may be serving cell 110, or non-serving cells 120 and/or 122, all of FIG. 1. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a Node B 708 to a UE 710, and the UL, also called the reverse link, refers to the communication link from a UE 710 to a Node B 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the Node B 708 over the HS-DPCCH to indicate whether it correctly decoded a packet on the downlink.

HS-DPCCH further includes feedback signaling from the UE 710 to assist the Node B 708 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the Node B 708 and/or the UE 710 may have multiple antennas supporting MIMO technology. The use of MIMO technology enables the Node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the Node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
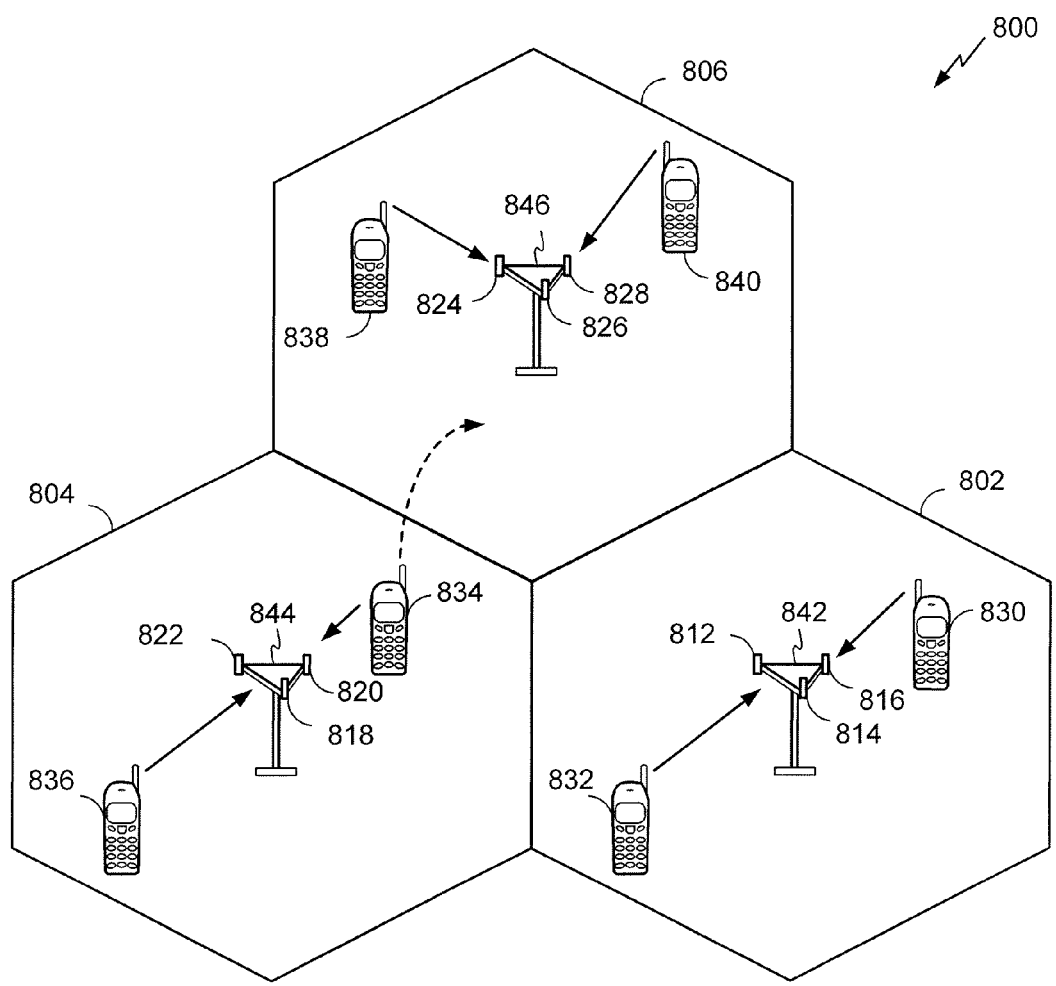
FIG. 8 is a conceptual diagram illustrating an example of an access network including the UE of FIG. 1.

Referring to FIG. 8, an access network 800 in a UTRAN architecture may include a UE 102 of FIG. 1, configured with transmit controller component 104. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with Node B 842, UEs 834 and 836 may be in communication with Node B 844, and UEs 838 and 840 can be in communication with Node B 846. Here, each Node B 842, 844, 846 is configured to provide an access point to a CN 704 (see FIG. 7) for all the UEs 830, 832, 834, 836, 838, 840 in the respective cells 802, 804, and 806. In an aspect, UEs 830, 832, 834, 836, 838, and/or 840 may be UE 102 of FIG. 1, and Nodes B 842, 844, and 846 may be serving cell 110 or non-serving cells 120 and/or 122, all of FIG. 1.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 9.

Figure 9:
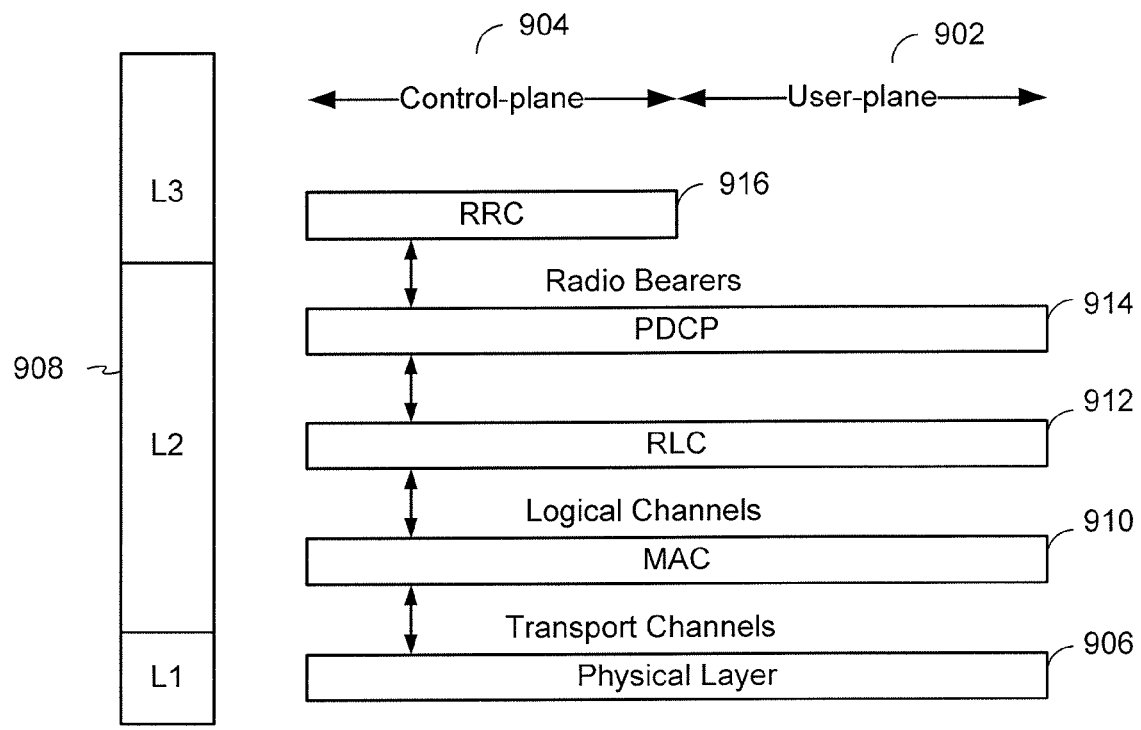
FIG. 9 is a conceptual diagram illustrating an example of a radio protocol architecture for the user and control plane that may be utilized by the UE and/or cells of FIG. 1.

Referring to FIG. 9, an example radio protocol architecture 900 relates to the user plane 902 and the control plane 904 of a user equipment (UE) or Node B/base station. For example, architecture 900 may be included in a UE such as UE 102 of FIG. 1, and/or a Node B/base station such as serving cell 110, non-serving cell 120, and/or non-serving cell 122, also of FIG. 1. The radio protocol architecture 900 for the UE and Node B is shown with three layers: Layer 1 906, Layer 2 908, and Layer 3 910. Layer 1 906 is the lowest lower and implements various physical layer signal processing functions. As such, Layer 1 906 includes the physical layer 907. Layer 2 (L2 layer) 908 is above the physical layer 907 and is responsible for the link between the UE and Node B over the physical layer 907. Layer 3 (L3 layer) 910 includes a radio resource control (RRC) sublayer 915. The RRC sublayer 915 handles the control plane signaling of Layer 3 between the UE and the UTRAN.

In the user plane, the L2 layer 908 includes a media access control (MAC) sublayer 909, a radio link control (RLC) sublayer 911, and a packet data convergence protocol (PDCP) 913 sublayer, which are terminated at the Node B on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 913 provides multiplexing between different radio bearers and logical channels. The PDCP sublayer 913 also provides header compression for upper layer data packets to reduce radio transmission overhead, security by ciphering the data packets, and handover support for UEs between Node Bs. The RLC sublayer 911 provides segmentation and reassembly of upper layer data packets, retransmission of lost data packets, and reordering of data packets to compensate for out-of-order reception due to hybrid automatic repeat request (HARQ). The MAC sublayer 909 provides multiplexing between logical and transport channels. The MAC sublayer 909 is also responsible for allocating the various radio resources (e.g., resource blocks) in one cell among the UEs. The MAC sublayer 909 is also responsible for HARQ operations.

Figure 10:
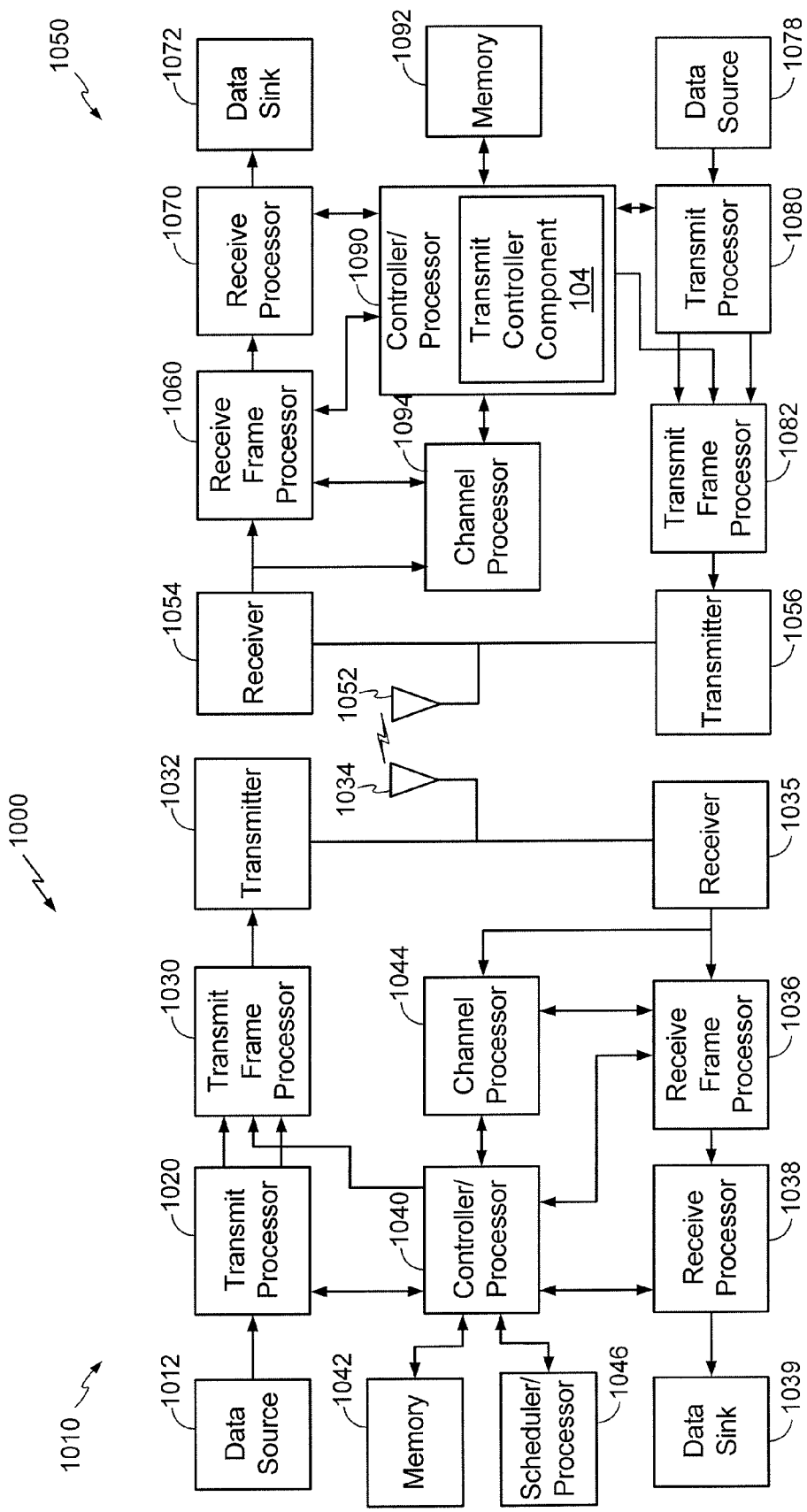
FIG. 10 is a block diagram conceptually illustrating an example of a Node B in communication with a UE, such as the UE of FIG. 1, in a telecommunications system.

FIG. 10 is a block diagram of a Node B 1010 in communication with a UE 1050, which may be configured to regain service by selecting a detected cell not included in a neighbor cell list (NCL). In an aspect, Node B 1010 may be Node B 708 of FIG. 7, serving cell 110, non-serving cell 120, and/or non-serving cell 122, all of FIG. 1, and UE 1050 may be UE 710 of FIG. 7 and/or UE 102 of FIG. 1. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). In an aspect, UE 1050 may include a controller/processor that may include transmit controller component 104. Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDME□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communications at a user equipment (UE), comprising:
generating a signaling radio bearer (SRB) packet comprising signaling information, wherein the SRB packet is configured to be transmitted on a channel according to a received scheduling serving grant; determining whether the SRB packet is unable to be transmitted based on resources allocated by the received scheduling serving grant;
overriding a scheduled mode operation that prohibits transmission of the SRB packet in response to determining that the SRB packet is unable to be transmitted based on the resources allocated by the received scheduling serving grant: and transmitting, in response to the overriding, at least a part of the SRB packet on the channel using at least a portion of the resources allocated by the received scheduling serving grant.

2. The method of claim 1, further comprising transmitting a scheduling information (SI) message to indicate whether an additional scheduling serving grant is needed.

3. The method of claim 2, wherein the transmitting of the SI message comprises transmitting the SI message in a same transmission time interval (TTI) as at least the part of the SRB packet is transmitted.

4. The method of claim 2, wherein the transmitting of the SI message comprises transmitting the SI message in a subsequent TTI relative to the TTI in which at least the part of the SRB packet is transmitted.

5. The method of claim 1, wherein the generating the SRB packet further comprises generating a plurality of SRB packets, and wherein the transmitting at least a part of the SRB packet further comprises transmitting the plurality of SRB packets on the channel.

6. The method of claim 5, wherein transmitting the plurality of SRB packets further comprises:
transmitting a first one of the plurality of SRB packets in a first TTI;
waiting one or more TTIs after the first TTI to perform a transmission of a second one of the plurality of SRB packets; and
transmitting the second one of the plurality of SRB packets in a second TTI after waiting the one or more TTIs.

7. The method of claim 6, further comprising receiving a number of scheduling serving grant down commands.

8. The method of claim 7, wherein the one or more scheduling serving grant down commands are received from a non-serving cell.

9. The method of claim 7, wherein the waiting one or more TTIs after the first TTI to perform a transmission is in response to receiving the number of scheduling serving grant down commands.

10. The method of claim 7, wherein the one or more scheduling serving grant down commands reduces the resources allocated by the received scheduling serving grant.

11. The method of claim 1, further comprising initiating a call setup before receiving the scheduling serving grant.

12. The method of claim 11, further comprising receiving the scheduling serving grant during the call setup.

13. The method of claim 1, wherein the channel comprises one or more transport/physical channels, and wherein transmitting at least a part of the SRB packet on the channel further comprises mapping at least the part of the SRB packet onto one or more scheduled flows that correspond to the one or more transport/physical channels.

14. The method of claim 13, wherein the one or more scheduled flows comprise one or more dedicated medium access control (MAC-d) flows.

15. A non-transitory computer-readable medium storing computer executable code for wireless communications at a user equipment (UE), comprising: code executable by a computer to generate a signaling radio bearer (SRB) packet comprising signaling information, wherein the SRB packet is configured to be transmitted on a channel according to a scheduling serving grant; code executable by the computer to determine whether the SRB packet is unable to be transmitted based on resources allocated by the received scheduling serving grant; code executable by the computer to override a scheduled mode operation that prohibits transmission of the SRB packet in response to determining that the SRB packet is unable to be transmitted based on the resources allocated by the received scheduling serving grant; and code executable by the computer to transmit, in response to the overriding, at least a part of the SRB packet on the channel using at least a portion of the resources allocated by the received scheduling serving grant.

16. An apparatus for wireless communications, comprising:
  means for generating a signaling radio bearer (SRB) packet comprising signaling information, wherein the SRB packet is configured to be transmitted on a channel according to a scheduling serving grant; means for determining whether the SRB packet is unable to be transmitted based on resources allocated by the received scheduling serving grant; means for overriding a scheduled mode operation that prohibits transmission of the SRB packet in response to determining that the SRB packet is unable to be transmitted based on the resources allocated by the received scheduling serving grant; and means for transmitting, in response to the overriding, at least a part of the SRB packet on the channel using at least a portion of the resources allocated by the received scheduling serving grant.

17. An apparatus for wireless communications, comprising:
  a signaling radio bearer (SRB) generator component configured to generate a SRB packet comprising signaling information, wherein the SRB packet is configured to be transmitted on a channel according to a scheduling serving grant; a grant determiner component including a processor and a memory configured to determine whether the SRB packet is unable to be transmitted based on resources allocated by the received scheduling serving grant; a grant overriding component including the processor and the memory configured to override a scheduled mode operation that prohibits transmission of the SRB packet in response to determining that the SRB packet is unable to be transmitted based on the resources allocated by the received scheduling serving grant; and a transmitter component configured to transmit, in response to the overriding, at least a part of the SRB packet on the channel using at least a portion of the resources allocated by the received scheduling serving grant.

18. The apparatus of claim 17, wherein the transmitter component is further configured to transmit a scheduling information (SI) message to indicate whether or not an additional scheduling serving grant is needed.

19. The apparatus of claim 18, wherein the transmitter component is further configured to transmit the SI message in a same transmission time interval (TTI) as at least the part of the SRB packet.

20. The apparatus of claim 18, wherein the transmitter component is further configured to transmit the SI message in a subsequent TTI relative to at least the part of the SRB packet.

21. The apparatus of claim 17, wherein the SRB generator component is further configured to generate a plurality of SRB packets, and wherein the transmitter component is further configured to transmit the plurality of SRB packets on the channel.

22. The apparatus of claim 21, wherein the transmitter component is further configured to: transmit a first one of the plurality of SRB packets in a first TTI; wait one or more TTIs after the first TTI to perform a transmission of a second one of the plurality of SRB packets; and transmit the second one of the plurality of SRB packets in a second TTI after waiting the one or more TTIs.

23. The apparatus of claim 22, further comprising a scheduling serving grant receiving component configured to receive a number of scheduling serving grant down commands.

24. The apparatus of claim 23, wherein the scheduling serving grant receiving component is further configured to receive the one or more scheduling serving grant down commands from a non-serving cell.

25. The apparatus of claim 23, wherein the transmitter component is further configured to wait the one or more TTIs in response to the scheduling serving grant receiving component receiving the number of scheduling serving grant down commands.

26. The apparatus of claim 23, wherein the one or more scheduling serving grant down commands reduces the resources allocated by the received scheduling serving grant.

27. The apparatus of claim 17, further comprising: a call setup component configured to initiate a call setup.

28. The apparatus of claim 27, wherein the scheduling serving grant receiving component is further configured to receive the scheduling serving grant during the call setup.

29. The apparatus of claim 17, wherein the channel comprises one or more transport/physical channels, and wherein the transmitter component is further configured to map at least the part of the SRB packet onto one or more scheduled flows that correspond to the one or more transport/physical channels.

30. The apparatus of claim 29, wherein the one or more scheduled flows comprise one or more dedicated medium access control (MAC-d) flows.

31. A method of wireless communications at a user equipment (UE), comprising:
  generating a plurality of signaling radio bearer (SRB) packets comprising signaling information, wherein the plurality of SRB packets are configured to be transmitted on a channel according to a received scheduling serving grant; determining whether the plurality of SRB packets are unable to be transmitted based on resources allocated by the received scheduling serving grant;
  overriding the received scheduling serving grant in response to determining that the plurality of SRB packets are unable to be transmitted; and transmitting the plurality of SRB packets on the channel, including: transmitting a first one of the plurality of SRB packets in a first transmission time interval (TTI); waiting one or more TTIs after the first TTI to perform a transmission of a second one of the plurality of SRB packets; and transmitting the second one of the plurality of SRB packets in a second TTI after waiting the one or more TTIs.

32. An apparatus for wireless communications, comprising:
  a signaling radio bearer (SRB) generator component configured to generate a plurality of SRB packets comprising signaling information, wherein the plurality of SRB packets are configured to be transmitted on a channel according to a scheduling serving grant; a grant determiner component configured to determine whether the plurality of SRB packets are unable to be transmitted based on resources allocated by the received scheduling serving grant; a grant overriding component configured to override the received scheduling serving grant in response to determining that the plurality of SRB packets are unable to be transmitted; and a transmitter component configured to transmit plurality of SRB packets on the channel, including being configured to: transmit a first one of the plurality of SRB packets in a first transmission time interval (TTI); wait one or more TTIs after the first TTI to perform a transmission of a second one of the plurality of SRB packets; and transmit the second one of the plurality of SRB packets in a second TTI after waiting the one or more TTIs.

* * * * *